3,511,784
FOAMED HYDROCHLORIC ACID AND METHOD
Olen L. Riggs, Jr., and David W. Barnett, Ponca City, Okla., assignors to Continental Oil Company, Ponca City, Okla., a corporation of Delaware
Filed Jan. 25, 1967, Ser. No. 611,691
Int. Cl. C11d 7/48; C23g 1/06
U.S. Cl. 252—148                        6 Claims

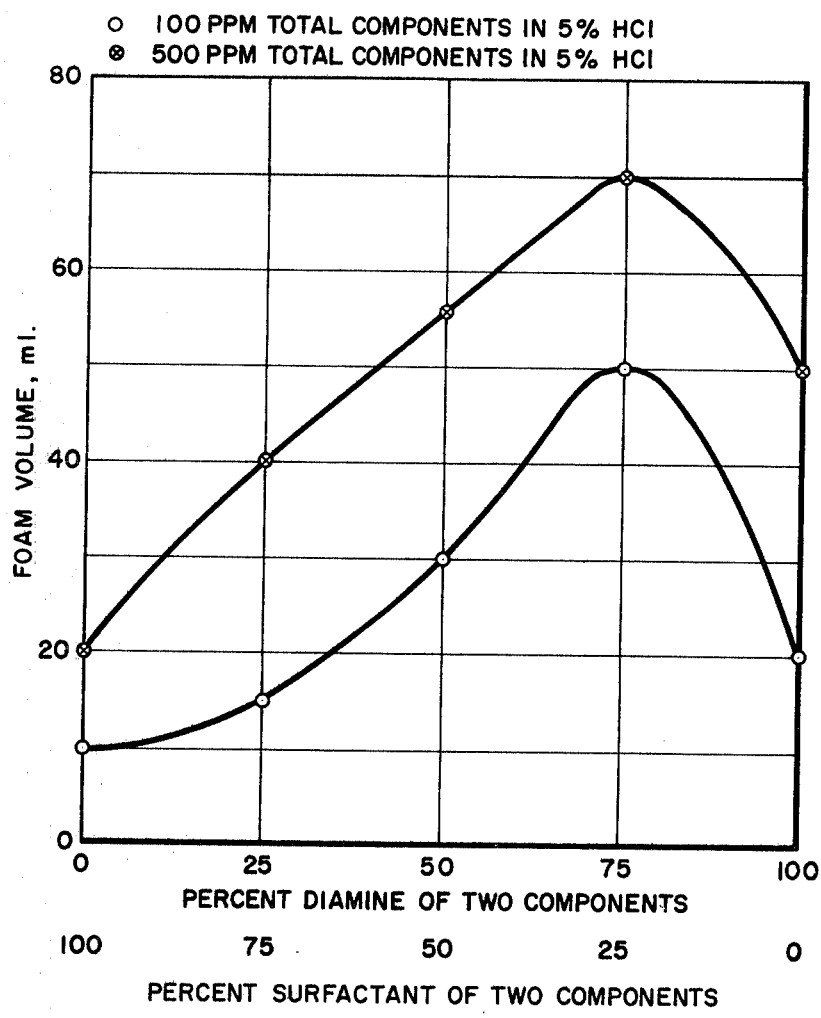

ABSTRACT OF THE DISCLOSURE

Hydrochloric acid is converted to a stable foam, useful, e.g., for cleaning equipment, by adding a nitrogenous corrosion inhibitor and a foaming agent.

BRIEF SUMMARY OF THE INVENTION

Hydrochloric acid has been foamed for various purposes in the past. Among the uses for foamed hydrochloric acid is as a pickling bath, where the foam reduces the splashing as articles are immersed in and removed from the bath, and for cleaning purposes, where the foam apparently removes foreign matter more effectively, and smaller quantities of acid are required for a given bulk.

We have now discovered a novel combination of compounds which is highly effective in producing a stable foam of hydrochloric acid. Broadly, the combination of reagents comprises a nitrogenous corrosion inhibiting compound and a surfactant. More specifically, the combination comprises an alkylene diamine and an alkylaryl polyether alcohol, the reagents being combined in synergistic proportion.

BRIEF DESCRIPTION OF THE DRAWING

In the drawing, the sole figure represents the foam volume of hydrochloric acid obtained when two different total concentrations of the additive are used, wherein the ratio of the two components in the additive are varied.

DETAILED DESCRIPTION OF THE INVENTION

According to the invention, a rich and stable foam of inhibited hydrochloric acid is obtained by adding thereto a mixture of an alkylene diamine and an alkylaryl polyether alcohol, the two components being present in a specified range of ratios to each other.

The corrosion inhibitor component, i.e. the alkylene diamine, is selected from the formulae (a)

$$R-NH-R'-NH_2$$

where R is an alkyl of about 12 to 22 carbons, preferably straight chain, and R' is alkylene of 2 to 3 carbons, and (b) $R''-CH(CH_3)-NH-R'''-NH_2$, where R'' is an alkyl of about 7 to 15 carbons, preferably straight chain, and R''' is alkylene of 2 to 3 carbons. These compounds can be classed respectively as $\alpha$- and $\beta$-diamines, and most are commercially available materials. For example, the $\alpha$-diamines are sold by Armour Chemical Company as their "Duomeen" series "C," "O," "S" and "T," and the $\beta$-diamines are sold by the same company as their "Duomeen L" series. Mixtures of any of these compounds can also be used. The primary requisite of the diamine component of the present composition is that it be capable of being solubilized in the hydrochloric acid by the surfactant component.

The surfactant component is a polyethoxylated alkylaryl alcohol, i.e. an alkylaryl polyether alcohol of the general formula

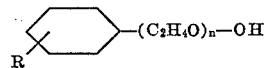

where R is alkyl of about 8 carbons average, and $n$ varies from about 7 to 40. This component can comprise a mixture of compounds wherein the alkylene varies, e.g. from about 7 to 9, with the average being preferably about 8, and wherein $n$ varies such that its average is within the stated range. These compounds are available commercially from Rohm and Haas Company as their "Triton X" series, e.g. X–100, X–102, X–114, X–165, X–305 and X–405.

Referring now to the drawing, it has been discovered that the two above-mentioned components produce a fortifying or synergistic effect on the amount and stability of the foam produced in hydrochloric acid, when they are present with respect to each other within a specified range of ratios. Thus, on a weight ratio, the diamine component should be present from about 55 to about 95 percent of the total additive, the balance being the polyether component. As can be seen from the drawing, such ratios provide a foam volume of the hydrochloric acid of at least about 32 ml. when the additive is present at a concentration of 100 p.p.m., and a volume of at least about 54 ml. at a concentration of 500 p.p.m., as will be explained further in the examples. An even more preferred range of ratios of the components comprises that where the diamine component is from about 65 to 85 percent of the total additive.

The two components can be pre-mixed and subsequently added to the hydrochloric acid, or they can be added separately, in either order, to the acid. Although both components can be used "full strength," i.e. 100% active, it is often preferable to mix the two components together in a solubilizing agent such as isopropanol; this reduces the viscosity of the additive, and is sometimes necessary to prevent precipitation of the diamine component, depending on the specific compounds used, their concentrations, temperature, etc. The additive is preferably added to the acid in amounts ranging from 50 to 2000 p.p.m., more preferably about 75 to 1500 p.p.m. As to the hydrochloric acid in which the additive is used, it can vary in strength from very dilute up to 15 weight percent HCl and even more. The acid is foamed by agitation such as shaking or stirring, or by other methods known in the art, and the resulting foam is very stable. The foamed acid can then be used for cleaning equipment, such as vessels and heat exchangers, in conventional manner.

The invention will not be illustrated by the following examples.

EXAMPLE 1

50 ml. of 5 weight percent hydrochloric acid was put into a separatory funnel. In a beaker, varying proportions of the β-diamine $C_{15}H_{31}$—CH($CH_3$)—NH—$C_3H_6$—$NH_2$ and the surfactant

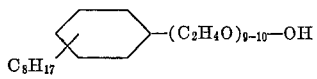

were blended in sufficient isopropanol to make 25 percent active solutions. The proper amount of solution to make the desired additive concentration (100, 500 p.p.m.) was then added to the separatory funnel, which was then shaken moderately for 10 seconds. The contents were then immediately poured into a graduated cylinder of about 1 inch I.D. Foam volume was measured immediately, and again after 10 minutes. Comparisons with other foaming agents were made in the same manner, with the following results.

TABLE 1

| Agent, wt. percent in alcohol | | Foam volume, ml. | | | |
|---|---|---|---|---|---|
| Diamine | Surfactant | 0 sec., 100 p.p.m. | 10 min., 100 p.p.m. | 0 sec., 500 p.p.m. | 10 min., 500 p.p.m. |
| 25 | 0 | 20 | 15 | 50 | 30 |
| 18.75 | 6.25 | 50 | 30 | 70 | 50 |
| 12.50 | 12.50 | 30 | 20 | 55 | 25 |
| 6.25 | 18.75 | 15 | 10 | 40 | 10 |
| 0 | 25 | 10 | 5 | 20 | 5 |
| Tween 80[1] | | -- | -- | 20 | 0 |
| Tween 20[2] | | -- | -- | 30 | 0 |
| Adoquat[3] | | -- | -- | 35 | 0 |

[1] Atlas Chemical Ind., polyoxyethylene sorbitan monooleate.
[2] Atlas Chemical Ind., polyoxyethylene sorbitan monolaurate.
[3] Continental Oil Company trademark for do decylbenzyl trimethyl ammonium chloride.

These results, of the combination of reagents of the present invention at time zero for both concentrations, are also shown in the figure. It can be seen from the above data that the preferred compositions of this invention produce a foam which is not only greater in initial volume, but also superior in stability.

EXAMPLE 2

The varying compositions of the two components of the present invention are tested in a manner similar to Example 1, the only change being that the α-diamine of the formula $C_{16}H_{33}$—NH—$C_2H_4$—$NH_2$ is used; similar results to that of Example 1 are obtained.

EXAMPLE 3

Example 1 is repeated, except that the surfactant is of the formula

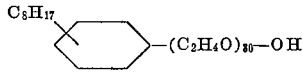

is used; again, similar results are obtained.

EXAMPLE 4

A comparison with prior-art mixtures was made, using the same acid and manipulative steps as in Example 1. The reagents used, and the time-zero foam volumes obtained, are shown in the following table. The results can be compared with those of the figure.

TABLE 2

| Agent | | Ratio, surfactant to amine | Foam volume, ml.— | |
|---|---|---|---|---|
| Surfactant | Amine | | At 100 p.p.m. | At 500 p.p.m. |
| Polyethoxylated tall oil | Dehydroabeityl amine | 9:1 | None | 5 |
| Triton X-100 [1] | do | 3:1 | 11 | 20 |

[1] $C_{15}H_{31}$—CH($CH_3$)—NH—$C_3H_6$—$NH_2$.

Results similar to those of the preceding examples are observed with hydrochloric acid concentrations of up to 15 weight percent and even more. Foamed acids of various of the preceding examples are used to clean scaled heat exchangers, with excellent results.

Having thus described the invention by providing specific examples thereof, it is to be understood that no undue limitations or restrictions are to be drawn by reason thereof and that many variations and modifications are within the scope of the invention.

What is claimed is:
1. A cleaning composition consisting essentially of a stable foamed hydrochloric acid of up to about 15 weight percent concentration containing an amount effective to produce a foam of
(a) a diamine selected from the formulae

$$R—NH—R'—NH_2$$

where R is alkyl of about 12 to 22 carbon atoms and R' is alkylene of 2 to 3 carbon atoms, and $$R''—CH(CH_3)—NH—R'—NH_2$$

where R'' is alkyl of about 7 to 15 carbon atoms and R' is as before, and
(b) a polyethoxylated alkylphenol of the formula

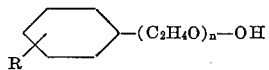

where R is alkyl of about 8 carbon atoms and $n$ is between about 7 and 40,
the ratio of component (a) to component (b) is 3:1, on a weight basis.

2. The composition of claim 1 wherein the total of components (a) plus (b) present in the acid is between about 50 and about 2000 p.p.m.

3. The composition of claim 2 wherein the hydrochloric acid is of a concentration between about 5 and about 15 weight percent HCl.

4. The method of producing a stable foamed hydrochloric acid which comprises admixing in hydrochloric acid of up to about 15 weight percent concentration an effective amount of
(a) a diamine selected from the formula $$R—NH—R'—NH_2$$

where R is alkyl of about 12 to 22 carbon atoms and R' is alkylene of 2 to 3 carbon atoms, and $$R''—CH(CH_3)—NH—R'—NH_2$$

where R'' is alkyl of about 7 to 15 carbon atoms and R' is as before, and (b) a polyethoxylated alkylphenol of the formula

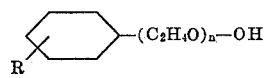

where R is alkyl of about 8 carbon atoms and $n$ is between about 7 and 40, the ratio of component (a) to component (b) is 3:1 on a weight basis.

5. The method of claim 4 wherein the total of components (a) plus (b) present in the acid is between about 50 and about 2000 p.p.m.

6. The method of claim 5 wherein the hydrochloric acid is a concentration between about 5 and about 15 weight percent HCl.

References Cited
UNITED STATES PATENTS

| | | | |
|---|---|---|---|
| 1,191,291 | 7/1916 | Drefahl | 134—41 |
| 1,766,902 | 6/1930 | Harrison | 252—148 |
| 2,050,933 | 8/1936 | De Groofe | 252—148 |
| 2,475,186 | 7/1949 | Kamlet | 252—390 |
| 2,649,415 | 8/1953 | Sandberg et al. | 252—8.55 |

OTHER REFERENCES

"Duomeens" Armour Chem. Co., Feb. 21, 1956, pp. 1–4.

MAYER WEINBLATT, Primary Examiner

W. E. SCHULZ, Assistant Examiner

U.S. Cl. X.R.

134—3, 28, 41; 252—307